United States Patent Office 3,414,381
Patented Dec. 3, 1968

3,414,381
METHOD FOR PRODUCING LOW DENSITY GRAPHITE STRUCTURES
Franciszek Olstowski, Freeport, and John D. Watson, Sr., Lake Jackson, Tex., assignors to The Dow Chemical Company, Midland, Mich., a corporation of Delaware
No Drawing. Filed Apr. 4, 1966, Ser. No. 539,631
7 Claims. (Cl. 23—209.1)

This invention relates to a process for producing graphite structures having a relatively low density and more particularly relates to a relatively low temperature process for re-expanding compressed vermicular graphite to produced such relatively low density structures.

It is known that graphite may be expanded into a light weight vermicular form by treating such graphite with an intercalating agent and heating to a relatively high temperature. It is likewise known that such vermicular graphite may be compressed to form shaped integral structures approaching the original graphite in density and physical properties. No method is presently available, however, for re-expanding such compressed graphite into light weight, integral structures, particularly where it is desirable to re-expand such compressed graphite at ambient temperatures.

It is an object of this invention to provide a method for re-expanding compacts made by compressing vermicular graphite. An additional object is to provide a process where such re-expansion may be conducted at or near ambient temperatures to produce light weight, integral bodies of graphite. These and other objects and advantages of the present invention will become obvious by reading the following detailed description.

It has now been discovered that compressed vermicular graphite compacts capable of being re-expanded to form light weight, integral graphite structures may be prepared by treating vermicular graphite with an expanding agent such as $Br_2$, $SO_3$, $N_2O_4$, $CrO_2Cl_2$ and $FeCl_3$ and the like in the fluid form and compressing such treated graphite to form a compact of the desired shape and density. In the case of solid expanding agents, e.g. $FeCl_3$ it is necessary to heat the agent to obtain its vapors within the graphite. The compact thus formed is re-expanded at ambient temperature to 25 times or more its original volume by contacting such compact with hydrogen peroxide or other inorganic peroxide or organic peroxide. The expanded structure thus produced is relatively light weight, retains its structural integrity, and retains the general shape of the original compact. Such expanded structure, however, has a substantially lower thermal conductivity than a graphite body prepared by merely compressing vermicular graphite to such density. This invention, therefore, provides a unique method for producing a graphite insulation having superior properties.

The vermicular graphite employed herein is a compressible form of graphite prepared by introducing an intercalating agent between the laminae of natural or synthetic graphite and expanding such treated graphite by heating to a temperature above about 200° C., and usually above 500° C. For example, a heat-expandable graphite may be prepared by contacting graphite particles with an intercalating agent such as fuming nitric acid, fuming sulfuric acid, mixtures of concentrated nitric acid and sulfuric acids, perhaloacids or the like. The treated graphite particles may then be washed free (except the perhaloacids, which will water-leach from the graphite) of excess intercalating agent and dried if desired. The resulting treated graphite may be expanded in volume from about 20 to about 600 times by heat, e.g. with a propane flame. Such expanded graphite is usually in light weight, particulate, worm-like form and is easily malleable and compressible into shaped monolithic structures.

Compression of such expanded vermicular graphite along a single axis will produce a compacted integral structure having high electrical and thermal anisotropy. Both electrical and thermal resistivity are highest in the direction of compression and lowest in the direction perpendicular to that of compression. The anisotropy ratio of such compressed structures increases with increasing compression up to or near the theoretical density of the graphite. Compression of vermicular graphite in two directions substantially reduces the anisotropic properties of the compressed structure and isostatic compression produces a structure having little or no anisotropy.

In order to produce the expandable structures of this invention, vermicular graphite is treated with one or more gaseous expanding agents. Such expanding agents are those fluids which, for the most part, are intercalating agents for graphite and which will form acidic solutions in water. They include $Br_2$, $SO_3$, $N_2O_4$, $CrO_2Cl_2$, $FeCl_3$, HF, HCl, $SiCl_4$, $BCl_3$, $TiCl_4$ and the like, with $Br_2$, $SO_3$, $N_2O_4$, $CrO_2Cl_2$ and $FeCl_3$ being usually preferred. Such agents are employed in amounts of from 0.05 to 20 percent by weight based on the weight of the vermicular graphite, with from about 0.5 weight percent to about 5.0 weight percent being preferred. Those agents (e.g. $FeCl_3$) which are solid at normal ambient temperatures must be heated during the vermicular graphite impregnation step in order that the agent will be fluidized and can appreciably penetrate the graphite particle.

After treatment with a suitable expanding agent, the vermicular graphite is compressed to the desired shape and density. Uniaxial compression such as is achieved by passing the vermicular graphite between rollers is mechanically the most practical means of compression and is therefore preferred for most applications. For most effective results, the density of the compressed vermicular graphite is at least 0.3 gm./cc. and usually between about 0.5 and 1.8 gm./cc. At this stage any necessary final shaping, sawing, drilling, or the like is most advantageously accomplished. Such compacts need not be expanded immediately after preparation. Graphite treated with expanding agents, whether or not compressed, shows little or no loss of properties upon storage. However, if highly volatile expanding agents are employed, it is preferred to compress the compact to a density of 0.5 gm./cc. or higher to assure that no substantial loss of expanding agent will occur during storage.

Expansion of such finally compressed and shaped compact, is accomplished by contact with a peroxide. Upon contact with a solution of $H_2O_2$ or other inorganic peroxide or solution of organic peroxide, the compact will expand in a controllable manner with a majority of the swelling or expansion taking place along the same axis as the axis of compression. A peroxide concentration in the solution used for expansion is usually employed which is between about 2 and 60 weight percent, and preferably from about 5 weight percent to about 30 weight percent. Hydrogen peroxide is the most readily available peroxide and is therefore usually preferred.

The rate and extent of expansion of the compact depends upon the concentration of the expanding agent within the graphite and the concentration of the $H_2O_2$ in the solution used to treat such compacts. With a high concentration of expanding agent in the graphite and the use of a concentrated $H_2O_2$ solution (e.g. 30 weight percent) an expansion of up to 20 times or more the original volume in an hour is achieved. Prolonged contact with the $H_2O_2$, e.g. 10 to 30 hours, will produce expansions of from 50 to several hundred times and yield a comparatively loose mass of vermicular graphite rather than the unitary structure produced with lesser amounts of expansion. Low concentrations of expanding agents and lower $H_2O_2$ concentrations produce less rapid rates of expansion and usually lower expansion ratios. Warming of the peroxide solution, e.g. to 40 to 90° C., will increase the rate of expansion but usually an acceptable rate is achieved at or near ambient temperatures. Temperatures of between about 20 and 40° C. are usually preferred. Usually the reaction of the peroxide solution with the expanding agent in the graphite will cause some detectable exotherm, especially if a high concentration of peroxide and a high concentration of expanding agent are simultaneously employed.

Light weight compacts produced in this manner usually have densities in the range of from .04 to 0.4 gm./cc., will withstand high temperatures, are resistant to oxidation and are malleable. Such characteristics enable them to find utility in a wide variety of applications. Of particular significance is the use of the expanded compacts of this invention as high temperature insulation. Suitable insulation may be prepared simply by compressing vermicular graphite to the desired density and configuration but employing the process of this invention provides an insulating material with a substantially decreased thermal conductivity and therefore greatly increased utility for high temperature insulation applications.

The following examples will serve to illustrate the invention but are not to be construed as limiting to the scope thereof.

Example 1

A mass of vermicular graphite having a bulk density of less than 0.5 lb./ft.$^3$ was contacted for 15 minutes at room temperature with $N_2O_4$ vapors. After such treatment, the vermicular graphite was uniaxially compressed under a pressure of 17,000 p.s.i. to yield a cohered sheet measuring 11.44 cm. x 3.18 cm. x 0.58 cm. The compact thus formed was immersed in a 30 weight percent aqueous solution of $H_2O_2$ at room temperature and expansion along the axis of compression was recorded at various intervals of time. The results were as follows:

| Time, min. | Thickness, cm. | Expansion ratio, final thickness/initial thickness |
|---|---|---|
| 0 | 0.58 | 1.0 |
| 45 | 4.3 | 7.4 |
| 120 | 9.1 | 15.7 |
| 270 | 10.7 | 18.5 |

In a similar manner, a mass of vermicular graphite weighing 45 grams was treated at room temperature with $N_2O_4$ vapor for about 30 minutes. After treatment, the graphite weighed 47 grams. The treated graphite was then compressed in a mold under a pressure of about 8500 p.s.i. to yield a cohered slab having a thickness of 0.67 cm. The slab was immersed for 2 hours in a 30 weight percent aqueous solution of $H_2O_2$ at room temperature. At the end of this period the slab had increased in thickness to 5.70 cm.

Example 2

In a manner similar to Example 1, a mass of vermicular graphite weighing 45.5 grams was treated with $SO_3$ at room temperature for about 40 minutes. After such treatment the vermicular graphite weighed 46.5 grams. The treated graphite was then compressed with a force of 8500 p.s.i. to yield a compact having a thickness of 0.44 cm. Immersion of the compact in 30 weight per cent aqueous solution of $H_2O_2$ at room temperature for 2 hours produced an increase in thickness to 1.10 cm.

Example 3

In a manner similar to Example 1, separate quantities of vermicular graphite were exposed to various concentrations of gaseous $Br_2$ and then uniaxially compressed under a force of 10,000 p.s.i. to yield compacts containing 0.5 weight percent $Br_2$, 1.0 weight percent $Br_2$ and 2 weight percent $Br_2$, respectively. Portions of these compacts were placed in contact with various concentrations of aqueous $H_2O_2$ at room temperature. Measurement of the expansion ratio (final thickness/initial thickness) showed the following results:

| Sample No. | Wt. percent $Br_2$ in graphite | Expansion ratio, 1 hr. 30% $H_2O_2$ | 15% $H_2O_2$ | 5% $H_2O_2$ | Expansion ratio after 30 min. 5% $H_2O_2$ at 90° C. |
|---|---|---|---|---|---|
| 1 | 2 | 60:1 | 10:1 | 2:1 | |
| 2 | 1 | 40:1 | 5:1 | 2:1 | |
| 3 | 0.5 | | | | 2:1 |

Example 4

In the same manner as above, a vermicular graphite compact having a density of 2.1 gm./cc. and containing 10 weight percent $FeCl_3$ was immersed in a 5 weight percent aqueous solution of $H_2O_2$. Within one hour, it increased in thickness 5-fold while retaining its structural integrity.

Likewise, a vermicular graphite compact containing 0.2 weight percent $CrO_2Cl_2$ was immersed in a 30 weight percent solution of $H_2O_2$. After 30 minutes of immersion the thickness of such compact had increased 6-fold.

In the same manner, separate samples of vermicular graphite were treated with HCl, $SiCl_4$ and HF, each sample was compressed into a compact and each compact was re-expanded by contact with $H_2O_2$.

Example 5

A portion of vermicular graphite having an apparent bulk density of about 0.2 lbs./ft.$^3$ was treated with fuming $H_2SO_4$ and compressed into a disc measuring $3/16$ inch thick, about 4 inches in diameter and having a density of about 76 lbs./ft.$^3$.

The disc, containing the expanding agent was expanded to a density of about 12.6 lbs./ft.$^3$ by contacting it with $H_2O_2$.

Thermal conductivity through the expanded disc (in the direction parallel to that of original compression and to the expansion direction) was found to be 3.2 B.t.u. inches. In comparison a disc having a density of about 12.0 lbs./ft.$^3$ prepared by compressing another portion of the untreated vermicular graphite, to such density, had a thermal conductivity through the disc (in the direction parallel to that of compression) of 15 B.t.u. inches. The expression "B.t.u. inches" means B.t.u./hour/ft.$^2$ of cross-section/° F./inch of thickness.

Various modifications can be made in the present invention without departing from the spirit or scope thereof for it is understood that we limit ourselves only as defined in the appended claims.

We claim:

1. A process for the preparation of relatively low density graphite compacts which comprises
    (a) treating vermicular graphite with an expanding agent,
    (b) compressing the treated vermicular graphite into an integral compact having a density of at least 0.3 gm./cc., and
    (c) treating such compact with a peroxide solution for a period sufficient to produce expansion of such compact.
2. The process of claim 1 wherein the expanding agent is an intercalating agent for graphite capable of forming an acid solution in water.
3. The process of claim 2 wherein the expanding agent is at least one member selected from the group consisting of $Br_2$, $SO_3$, $N_2O_4$, $CrO_2Cl_2$, $FeCl_3$, HF, HCl, $SiCl_4$, $BCl_3$ and $TiCl_4$.
4. The process of claim 3 wherein the expanding agent is $Br_2$, $SO_3$, $N_2O_4$, $CrO_2Cl_2$, $FeCl_3$ or mixtures thereof.
5. The process of claim 1 wherein the treated vermicular graphite is compressed to a density of between about 0.5 gm./cc. and about 1.8 gm./cc.

6. The process of claim 2 wherein the compact of treated vermicular graphite is immersed in an aqueous solution of $H_2O_2$ containing between about 2 and about 60 weight percent $H_2O_2$.

7. The process of claim 2 wherein the compact of treated vermicular graphite is immersed in an aqueous solution of $H_2O_2$ containing between about 5 weight percent and 31 weight percent $H_2O_2$.

References Cited

UNITED STATES PATENTS 3,357,929  12/1967  Olstowski _____ 252—444

FOREIGN PATENTS 991,581  5/1965  Great Britain.

OTHER REFERENCES

Thiele, H.: "Die Vorlange bei dem Aufblahem von Graphit," in Z. Anorg. U. Allg. Chem., 207 (1932), pp. 340–352.

Croft, R.: "Graphite Compounds," in Research, Science and Its Application in Industry, London, Butterworths Scientific Publications, January 1957, pp. 23–28.

Ubbelohde, A. R.; Graphite and Its Crystal Compounds, London, Claredon Press, 1960, pp. 123–127.

JULIUS FROME, *Primary Examiner.*

P. E. ANDERSON, *Assistant Examiner.*